United States Patent [19]

Holtermann

[11] 4,198,859
[45] Apr. 22, 1980

[54] HEAT FLOW PROBE

[76] Inventor: Ludwig K. Holtermann, 43 Ragged Rock Rd., Old Saybrook, Conn. 06475

[21] Appl. No.: 959,341

[22] Filed: Nov. 9, 1978

[51] Int. Cl.² .................................................. G01K 17/00
[52] U.S. Cl. ................................. 73/190 H; 73/DIG. 7
[58] Field of Search ............. 73/190 H, DIG. 7, 341, 73/342, 362 SC

[56] References Cited

U.S. PATENT DOCUMENTS

| | | | |
|---|---|---|---|
| 3,076,051 | 1/1963 | Haba | 136/204 |
| 3,440,883 | 4/1969 | Lightner | 73/362 SC |
| 3,808,889 | 5/1974 | Rawson et al. | 73/190 H |
| 4,003,250 | 1/1977 | Poppendiek et al. | 73/190 H |
| 4,102,196 | 7/1978 | Holtermann | 73/190 H |

*Primary Examiner*—Donald O. Woodiel
*Attorney, Agent, or Firm*—DeLio and Montgomery

[57] ABSTRACT

A heat flow monitoring system comprising a heat flow sensor and a meter which is powered by the current from the sensor. The sensor includes a multiplicity of thermoelectric elements in series, mounted to have a hot side and a cool side, such that heat flux in either direction will create an emf sufficient to drive the meter and indicate heat flux values in terms of BTU/ft.²-hr. and/or watts/cm². The meter circuit may include resistances for adjustment to different ranges of heat flux values.

6 Claims, 4 Drawing Figures

U.S. Patent     Apr. 22, 1980     4,198,859
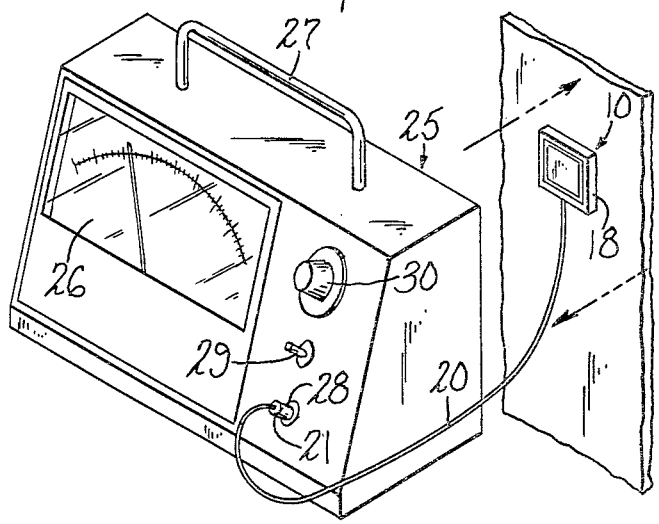
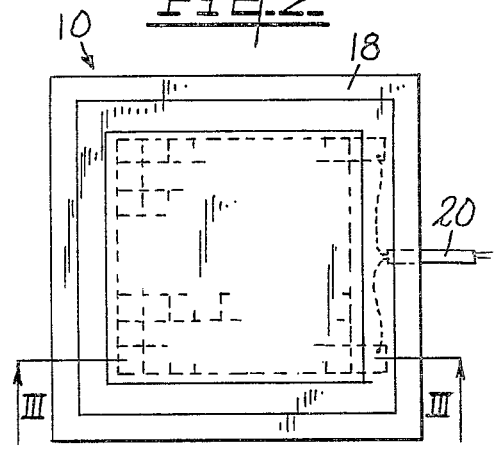
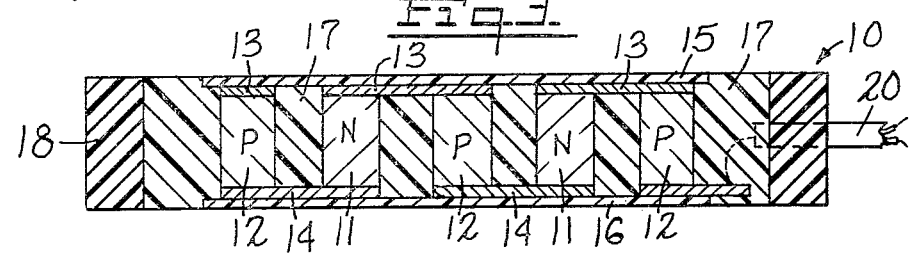
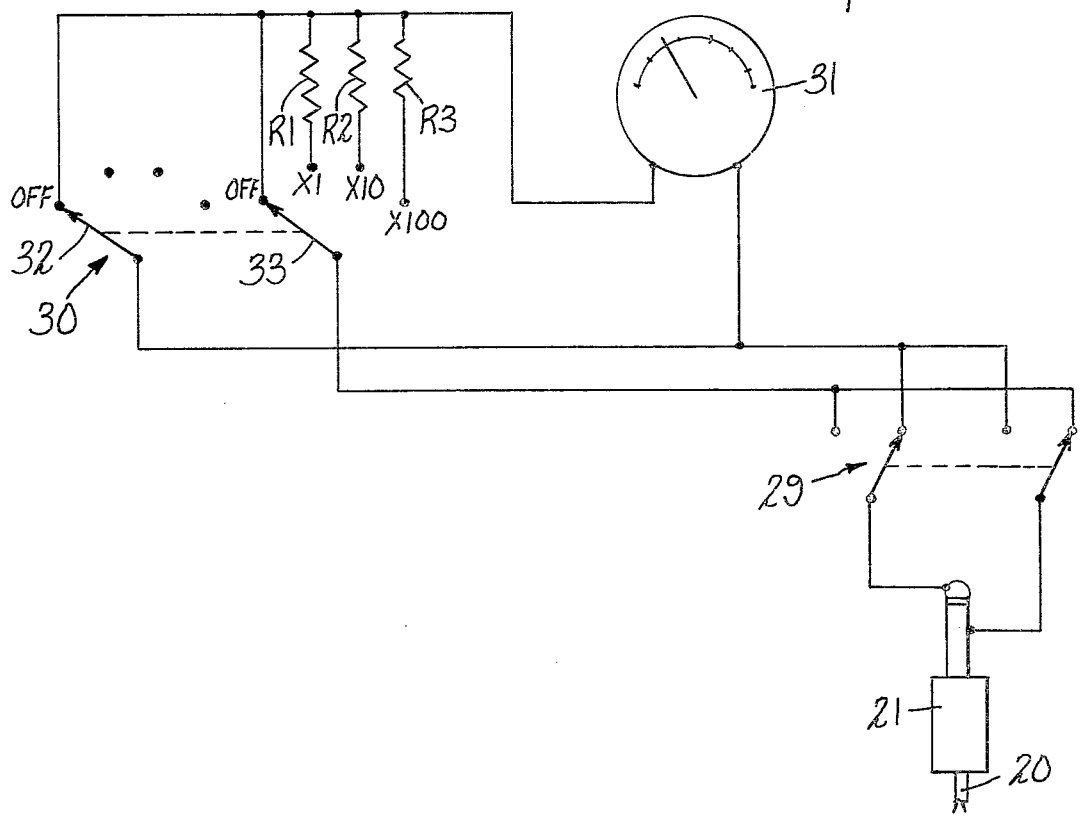

HEAT FLOW PROBE

This invention relates to a heat flow monitoring system comprising a heat flow sensor, adapted to be applied to the surface of a material to be observed, and an analog meter which is powered thermoelectrically by the current from the heat flow sensor. The sensor includes an array of thermoelectric elements, in series, having an emf output sufficiently high to drive a 0 to 5 mv analog meter at low heat flux and the meter is preferably scaled to indicate measurements from 0 BTU/ft.$^2$-hr. to 1000 BTU/ft.$^2$-hr., or more, in ranges of 0 to 10, 0 to 100 and 0 to 1000. The scale may also be graduated in watts/cm$^2$, and the meter should have reversible polarity for monitoring heat flow in either direction.

It is well known that certain thermoelectric elements can be assembled in series and used as a heat pump, for heating or cooling purposes (the Peltier effect) as disclosed, for instance in Haba U.S. Pat. No. 3,076,051, which also mentions but does not discuss the reverse operation of such an assembly for power generating. The very extensive literature on this general subject also includes the Lightner U.S. Pat. No. 3,440,883 on a semiconductor thermometer using oppositely poled diodes and a DC power supply. A temperature sensor utilizing a multiplicity of thermocouples without an external power supply is shown in applicant's U.S. Pat. No. 4,102,196, the sensor being useful to observe the temperature of an elongated moving object such as a wire. The advantages of an instrument which is self-powered over one requiring a power supply, are apparent.

In addition to measurement of temperatures of objects (or the ambiance) it may be essential or desirable to measure and evaluate such parameters as:

Thermal conductivity of materials and insulations
Heat flow in chemical and metallurgical processes
Heating or cooling ducts
Building heat losses: windows, ceilings, floors and walls
Boiler and steam pipe heat loss
k, U and R factors (k representing thermal conductivity of a particular material, U representing heating conductance and R representing thermal resistance, 1/U).

It is accordingly an object of the present invention to provide a self-powered system comprising a heat flow sensor which is compact, durable and reliable, and a sensitive meter adapted to respond to the output of the sensor with a visual indication of emf.

It is another object of the invention to provide the meter with calibrations which translate the emf into BTU/ft.$^2$-hr. and/or watts/cm$^2$.

It is a further object of the invention to provide the meter with circuitry capable of responding to the electrical input throughout a plurality of ranges.

It is yet another object of the invention to provide the meter with means for reversing its polarity to accommodate both positive and negative heat flow conditions.

It is a still further object of the invention to provide certain improvements in the form, construction and arrangement of the several parts by which the above-named and other objects may effectively be attained.

The invention accordingly comprises the features of construction, combinations of elements and arrangement of parts which will be exemplified in the constructions hereinafter set forth, and the scope of the invention will be indicated in the claims.

A practical embodiment of the invention is shown in the accompanying drawing, wherein:

FIG. 1 represents a perspective view of the complete system with the sensor resting against a surface to be observed and the meter box resting on any convenient support, not shown;

FIG. 2 represents a top plan view of the sensor;

FIG. 3 represents a transverse section on the line III—III of FIG. 2;

FIG. 4 is a wiring diagram for the meter and its associated circuits.

Referring to the drawing, the heat flow sensor 10 (FIGS. 2 and 3) comprises a multiplicity of P and N type thermoelectric elements 11, 12 connected in series by conductive bridges 13, 14 (e.g., of copper) soldered to the ends of the elements 11, 12. The latter are preferably of bismuth telluride (Bi$_2$Te$_3$) which is a semiconductor; up to 142 elements may be used, arranged in a square or rectangular design. The conductive bridges are covered by upper and lower thin ceramic sheets 15, 16 to provide insulation and serve as strong, self-retained packaging. The air spaces between the thermoelectric elements are filled with epoxy potting material 17, which also seals the thermoelectric assembly within a rectangular frame 18 of high temperature plastic such as polyamide, laminated plastic or molded epoxy. (Sensor dimensions of 30 mm×30 mm×4.8 mm are appropriate.)

Leads from the respective ends of the array of thermoelectric elements run to a two-wire cable 20 which may suitably have a length of 1.5 to 2 meters and terminate in a "phone plug" 21. The cable should be 26 AWG, Teflon coated, double lead wire, black and white, overall copper braided (shielded) and Teflon (TFE) white covered, complying with MIL SPEC, MIL-W-168780, Type E, or an equivalent thereof.

The instrument box 25 is made in convenient shape for resting firmly on a flat surface, with a sloped front containing the meter window 26, for good readability, and a carrying handle 27. The jack 28 is adapted to receive the plug 21, the switch 29 effects reversal of polarity, and the switch 30 is a four-position two-pole rotary switch, functioning as explained below.

Referring to FIG. 4, the meter 31 of the analog type having a range of 0–5 mV 20Ω (ohms) to which the sensor is matched. Its 4¼ inch scale is calibrated in BTU/ft.$^2$-hr. and watts/cm$^2$, instead of millivolts. The switch 29 is a two-position switch for reversing polarity of the signals received from the jack. The switch 30 is shown in its OFF position wherein the arms 32, 33 short out the meter regardless of the position of the polarity switch, such shorting serving to protect the meter and extend its life. The active terminals X1, X10, X100 in the switch 30 are associated with resistances R$_1$, R$_2$ and R$_3$ for recording current signals in different ranges of BTU/ft.$^2$-hr, such as 0 to 10, 0 to 100 or 0 to 1000 according to the absolute values of the heat flux being monitored by the sensor.

In use, the sensor 10 is applied to the surface of a body to be monitored, the direction of heat flow is known or ascertained in order to properly set the polarity switch and the range switch is turned to an appropriate range. Assuming that the surface 15 is the hot face with a temperature I$_h$ and the surface 16 is cold face with a temperature T$_c$, the heat passing through the thermoelectric elements 11, 12 from the (conductive) hot plates 13 to the (conductive) heat sinks 14 produces voltages in each of the series-connected elements, the voltages being additive and the total power (emf) being fed through the cable 20 to the meter.

The elements 11, 12 are preferably of bismuth telluride ($Bi_2Te_3$) because that semi-conductive material exhibits a high millivolt output as a function of temperature. In other words it possesses a high Seebeck Coefficient: S=volts/°K. or, expressed as a Figure of Merit:

$$Z = \left[ \frac{S_{PN}}{\sqrt{\partial p k p} + \sqrt{\partial n k n}} \right]^2$$

where $\rho$=specific electrical resistivity (ohm-cm)
k=specific thermal conductivity (watts/cm°K.).

While it has been found convenient to use 142 thermoelectric elements, a larger or smaller number could be provided, if desired, so long as the current generated is adequate.

When the heat flow sensor is attached to a wall surface, or the like, to be studied, the heat flow into or from the surface passes through the heat flow sensor creating a temperature gradiant within the sensor. This temperature differential causes the multiple miniature thermoelectric components to generate an output that is directly proportional to the heat flow. This electrical output is indicated by the meter. The sensor can be mounted by putting masking tape along the edges, using double-sided tape or by attaching the sensor with screws, utilizing mounting holes, not shown. Where more permanency is desired, the sensor can be glued to the surface. It is important that the heat flow sensor lies flat against the surface with no air convection losses from between the sensor and the surface to be studied. The space can be filled with silicon grease, for irregular surfaces.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

What I claim is:

1. A heat flow probe comprising a heat flow sensor, a meter, and means connecting the sensor to the meter, the sensor including a multiplicity of thermoelectric elements mounted in a frame, connected in series to generate an additive emf signal and arranged to present a hot face and a cold face, the meter being an analog meter having a range on the order of 0 to 5 mV and having its scale calibrated in BTU/ft.$^2$-hr., and the connecting means including a circuit having a first switch for reversing the polarity of the signal.

2. A heat flow probe according to claim 1 wherein the scale is calibrated in watts/cm$^2$.

3. A heat flow probe according to claim 1 or 2 which includes electrically insulating protective sheets on the hot and cold faces of the sensor.

4. A heat flow probe according to claims 1 or 2 wherein the connecting means includes a circuit having a second switch adjustable selectively to record current signals in different ranges.

5. A heat flow probe according to claim 4 wherein the second switch is adjustable to an OFF position wherein the meter is shorted.

6. A heat flow probe according to claims 1 or 2 wherein the connecting means includes a double wire cable and a plug and jack connection to the meter.

* * * * *